(12) United States Patent
Jevons

(10) Patent No.: US 10,232,396 B2
(45) Date of Patent: Mar. 19, 2019

(54) METHOD FOR MASKING A GAP

(71) Applicant: Oliver Jevons, Cheshire (GB)

(72) Inventor: Oliver Jevons, Cheshire (GB)

(73) Assignee: JTape Ltd., Cheshire (GB)

( * ) Notice: Subject to any disclaimer, the term of this patent is extended or adjusted under 35 U.S.C. 154(b) by 0 days.

(21) Appl. No.: 15/747,372

(22) Filed: Jan. 24, 2018

(65) Prior Publication Data
US 2018/0257096 A1    Sep. 13, 2018

Related U.S. Application Data

(62) Division of application No. 13/812,154, filed as application No. PCT/GB2011/000649 on Apr. 27, 2011, now abandoned.

(30) Foreign Application Priority Data

Apr. 27, 2010    (GB) .................................. 1007014.2

(51) Int. Cl.
*B05B 12/24*    (2018.01)
*B05B 12/26*    (2018.01)
*B29L 7/00*    (2006.01)

(52) U.S. Cl.
CPC ............ *B05B 12/24* (2018.02); *B05B 12/265* (2018.02); *B29L 2007/007* (2013.01)

(58) Field of Classification Search
CPC ........ B05B 12/20; B05B 12/24; B05B 12/265
See application file for complete search history.

(56) References Cited

U.S. PATENT DOCUMENTS

| | | | |
|---|---|---|---|
| 4,996,092 A | 2/1991 | Francis et al. | |
| 5,128,176 A | 7/1992 | Schmidt | |
| 5,547,725 A | 8/1996 | Barrows et al. | |
| 6,627,259 B1 * | 9/2003 | Jevons | B05B 12/26 427/282 |
| 2004/0058129 A1 * | 3/2004 | Bouic | B29C 59/02 428/156 |
| 2004/0109984 A1 | 6/2004 | Bouic | |
| 2005/0006021 A1 | 1/2005 | Bouic | |
| 2005/0118395 A1 | 6/2005 | Perez | |

FOREIGN PATENT DOCUMENTS

| | | |
|---|---|---|
| EP | 0365510 | 4/1990 |
| WO | WO99/12654 | 3/1999 |

OTHER PUBLICATIONS

International Search Report and Written Opinion for PCT/GB2011/000649, dated Aug. 10, 2011, 10 pages.

* cited by examiner

*Primary Examiner* — Xiao S Zhao
(74) *Attorney, Agent, or Firm* — Dority & Manning, P.A.

(57) ABSTRACT

A method for masking a gap between a closure panel member and a surround, such, for example, as an automobile door arrangement, in which a mask protrudes from the gap and overlies the panel member edge defining a space tapering towards the edge, whereby to feather the paint towards the edge, and masking tapes used in carrying out the method. The masking can be effected by introducing a resiliently deformable elongate strip mask into the gap so as to compress it to be pinched in the gap to protrude therefrom and, after painting, to remove the strip from the gap prior to overpainting. The mask may be introduced with the closure member closed, and needs no adhesive to hold it to the door or surround.

9 Claims, 4 Drawing Sheets

METHOD FOR MASKING A GAP

RELATED APPLICATION

The present application is a divisional of U.S. application Ser. No. 13/812,154 having a filing date of Jan. 25, 2013, which claims priority to International Application No. PCT/GB2011/000649 filed under the Patent Cooperation Treaty having a filing date of Apr. 27, 2011, which claims priority to Great Britain Patent Application No. 1007014.2, filed on Apr. 27, 2010, all of which are hereby incorporated by reference herein in their entirety for all purposes.

This invention relates to masking, more particularly but not exclusively masking for automobile refinishing.

In automobile refinishing, a primary use of foam masking tape is for sealing the interior of a vehicle against ingress of lacquer when doors and other openings are being sprayed. This is usually done with a masking tape according to EP0365510 which comprises an elongate, roughly circular section foam strip with an adhesive stripe that is attached to the door surround while the door is open, and which, when the door is closed on the adhered strip, seals off the gap. In a later development, a foam strip with a bullet-shaped or roughly oval cross section has an adhesive stripe that is attached to the inner edge of the door—when the door is closed, the foam is trapped between the door and the doorpost.

The idea in each case is for the foam to absorb excess spray so as not to leave a hard edge when the spray dries.

The foam is trapped at or beneath the level of the gap, allowing paint to penetrate some way into the gap or at least around the edge of the door. With the bullet shaped foam attached to the door, the so-called wet-on-wet process can be used, in which, after a first, primer coat, the mask is left in place but eased further into the gap, by running a finger around the gap, for the second coat, which thereby overlaps the edge of the first so that no primer is revealed in the finished paint job. A problem with this is that primer is applied around the very edge of the door, and forms a soft edge to the paintwork, which is more liable to be chipped or rubbed off, even after the second coat is applied.

The present invention provides a method of masking that avoids this problem and masking tapes for use in such method.

The invention comprises, in one aspect, a method for masking a gap between a closure panel member and a surround, in which a mask protrudes from the gap and overlies the panel member edge defining a space tapering towards the edge, whereby to feather the paint towards the edge.

The invention comprises, in another aspect, a method for masking a gap between a closure member and a surround by introducing a resiliently deformable elongate strip mask into the gap so as to compress it to be pinched in the gap to protrude therefrom and, after painting, to remove the strip from the gap prior to overpainting. The mask may be introduced with the closure member closed.

The strip may be held in the gap solely by the pinching effect and without the use of adhesive. The mask may overlie the panel member edge defining a space tapering towards the edge, whereby to feather the paint towards the edge.

The tape may be a foam tape, and may comprise a superabsorbent polymer.

The invention also comprises masking tape adapted to mask a gap between a closure member and a surround comprising a part of the tape adapted to protrude from the gap and overlie the panel edge defining a space tapering towards the edge, whereby to feather the paint towards the edge.

The tape may be resiliently deformable and to be wider than a gap which it is intended to mask so that it compresses on introduction to the gap to be pinched therein for retention. The strip may have no adhesives stripe, and be adapted to be held in the gap solely by the pinching effect.

The tape may have a cross section comprising two circles joined by a web. The circles may be of different sizes. One circle may have a diameter up to twice that of the other, for example 7 or 8 millimetres and 5 millimetres in diameter. In use, the smaller diameter section would be pushed into the gap, leaving the larger diameter section outwith the gap, to form the tapering space by virtue of the cusp between the section and the panel edge. Such a section would be held in the gap by elastic deformation of the web and/or of one or other or both the circular sections. The smaller section may be larger than the gap, in order to help retain the mask in place in the gap.

The larger diameter section might not be a complete circle—a semicircular section would suffice and would be economical of material, and even that might be hollowed out or grooved.

Such sections might be made by a method as described in EP0384626, EP1539369 and EP1539370, in which a web of foam is passed between blunt rotary discs that 'weld' the foam where they compress it so that it retains its compressed state, without, of course, the application of adhesive. The invention also comprises a method for making a masking tape, comprising passing a web foam between blunt rotary discs of an array of such discs extending across the width of the foam that 'weld' the foam where they compress it so that it remains in its compressed state so as to form parallel weld lines in the foam, in which some discs compress the foam more than others whereby to form some weld lines along which the foam can be separated.

The invention also comprises a method for masking at a gap between two members at least one of which is a thin panel such as an automobile window or is a thin edge of a wider panel such as a door, comprising trapping an elongate masking tape in the gap, the masking tape having a cross section which is pinched with lobes either side of the pinch, the tape being disposed so that the lobes are on opposite sides of the panel, whereby to mask against penetration of the gap and to hold the tape in place.

The relative sizes of the gap and the tape may be such that the tape can be introduced by compressing a section of one lobe so as to pass through the gap so that one lobe is on one side and the other lobe is on the other side of the panel, but the tape is slidable along the gap so that the entire gap can be masked by slidingly introducing the tape. The tape may be introduced by compressing at one end of the tape.

The gap may be openable for tape insertion, as by winding down a window slightly, and closable to trap the tape, as by winding up the window.

Embodiments of masking tapes, methods of using them and methods of making them will now be described with reference to the accompanying drawings, in which FIG. 1 is a cross section of a first embodiment of masking tape, shown deployed in an automobile door gap;

Figure 1:
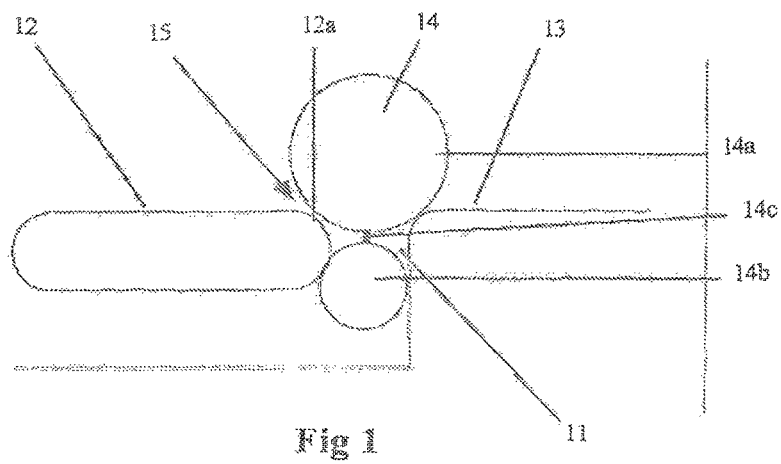

The drawings illustrate a method for masking a gap 11 between a closure panel member 12 and a surround 13, in which a mask 14 protrudes from the gap 11 and overlies the panel member edge 12a defining a space 15 tapering towards the edge 13a, whereby to feather the paint towards the edge 12a.

Figure 6:
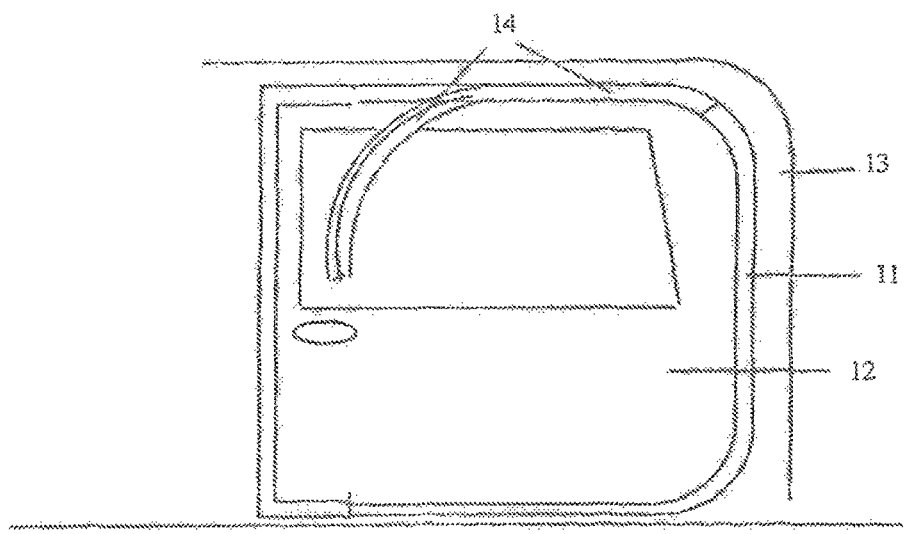
FIG. 6 is a view of an automobile door being masked with a masking tape as shown in FIGS. 1 to 5.

The drawings also illustrate a method for masking a gap 11 between a closure member 12 and a surround 13 by introducing a resiliently deformable elongate strip mask 14 into the gap 11 so as to compress it to be pinched in the gap 11 to protrude therefrom and, after painting, to remove the strip 14 from the gap 11 prior to overpainting. The mask may be introduced, as seen in FIG. 6, with the closure member closed, which shows a door 12 closed in a door surround 13, the strip mask 14 being introduced into the gap 11 between door 12 and surround 13 whilst the door 12 is closed. Conventional masking tapes used for masking at the gap 11 are applied by an adhesive stripe to either the surround 13 or the door 12 while the door 12 is open, the door being then closed to trap the tape in the gap 11.

The tape 14 is held in the gap 11 solely by the pinching effect and without the use of adhesive. The mask 14 overlies the panel member edge 12a defining a space tapering towards the edge 12a, whereby to feather the paint towards the edge.

The tape 14 comprises a foam tape, and may comprise a superabsorbent polymer foam tape.

The tape 14 is resiliently deformable and wider than the gap 11 so that it compresses on introduction to the gap 11 to be pinched therein for retention. The strip may have no adhesives stripe, and be adapted to be held in the gap solely by the pinching effect.

The tape 14 illustrated in FIG. 1 has a cross section comprising two circles 14a, 14b joined by a web 14c. The circles are of different sizes. One circle 14a may have a diameter up to twice that of the other 14b, for example 7 or 8 millimetres and 5 millimetres in diameter. In use, the smaller diameter section 14b would be pushed into the gap 11, leaving the larger diameter section 14a outwith the gap 11, to form the tapering space by virtue of the cusp between the section 14a and the panel edge 12a. Such a section would be held in the gap by elastic deformation of the web and/or of one or other or both the circular sections. The smaller section 14b may be larger than the gap 11, in order to help retain the mask in place in the gap 11. Such tapes are correctly located in the gap by their shape, that essentially dictates that one circle should be held outside the gap, the other within the gap. They are, while capable of masking the gap effectively, also able to be adjusted along the gap, so that they can be introduced at pone corner, say, of the surround, and simply pushed around the entire periphery.

Figure 2:
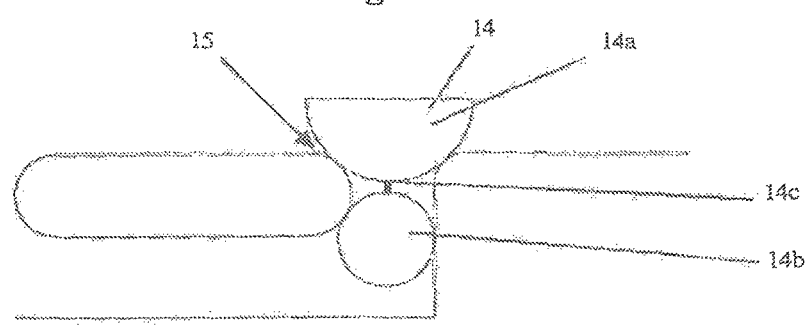
FIG. 2 is a cross section like FIG. 1, showing a second embodiment.
Figure 3:
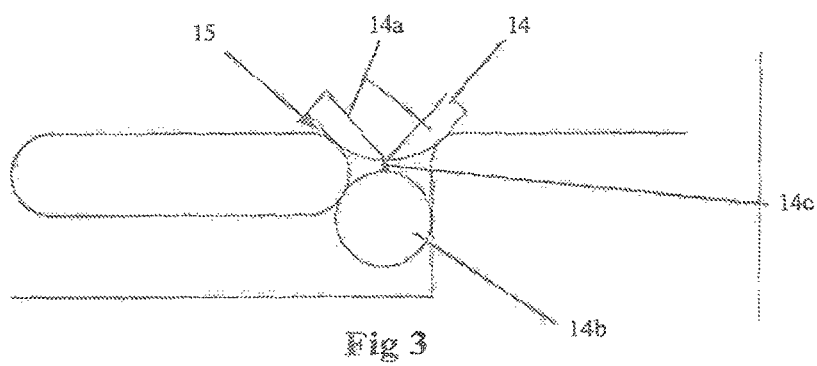
FIG. 3 is a cross section like FIG. 1, showing a third embodiment.

The larger diameter section might not be a complete circle—a semicircular section, as illustrated in FIG. 2, would suffice and would be economical of material, and even that might be hollowed out or grooved, as is illustrated in FIG. 3. Even more material might be removed, as seen in FIG. 3.

Figure 4:
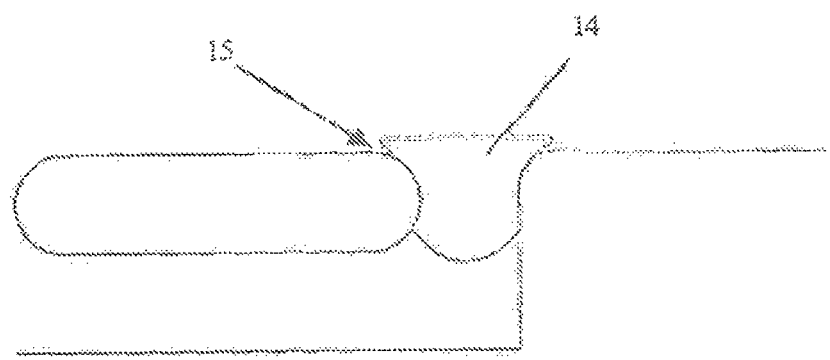
FIG. 4 is a cross section like FIG. 1, showing a fourth embodiment.
Figure 5:
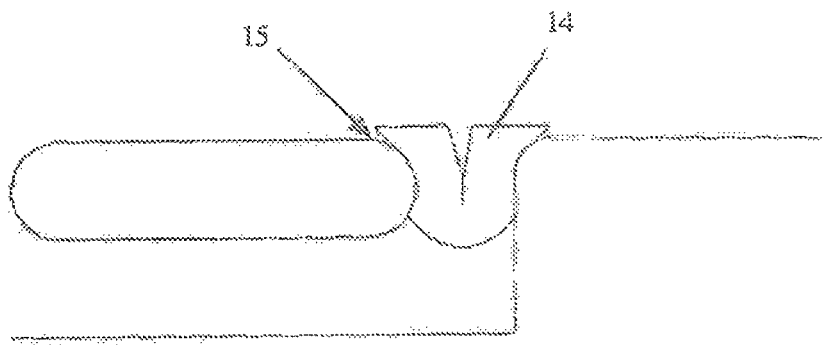
FIG. 5 is a cross section like FIG. 1m showing a fifth embodiment.

FIG. 4 illustrates a tape 14 which is so profiled that it can be squeezed into the gap 14 and held therein by being pinched between the edge 12a and the surround 13. FIG. 5 shows a similar tape 14 that is folded to fit into the gap 11.

Figure 7:
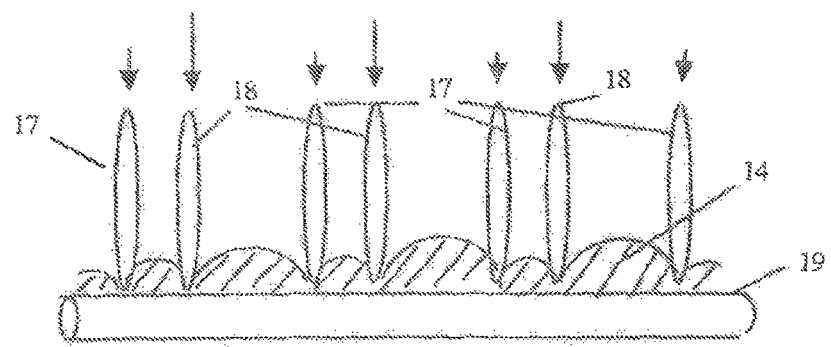
FIG. 7 is an elevation of a cold welding arrangement for making tapes as illustrated in FIG. 1.

FIG. 7 illustrates how the sections illustrated in FIG. 1 are made by a method as described in EP0384626, EP1539369 and EP1539370, in which a web 16 of foam is passed between an array of blunt rotary discs 17, 18 and a backing roller 19 that 'welds' the foam where the discs compress it against the roller 19 so that it retains its compressed state, without, of course, the application of adhesive, but solely as a result of the heating that occurs due to the compression. Adjacent discs 17, 18 are so spaced that they define smaller and larger strips of foam, and are urged toward the roller 19 with alternating greater and lower pressures, as indicated by the down arrows, so that masking strips, each comprising one large and one small section held together by a narrow web, can be separated from each other by tearing along the lines where discs 18 have been applied.

The tape illustrated in FIG. 1 and, of course, the other tapes, may be made in other ways, for example by extrusion through an appropriately shaped die.

While particularly adapted to mask for a primer coat, the tape, particularly the embodiments of FIGS. 1, 2 and 3, may, for the application of a second coat, either be left where they are, so that the edge of a lacquer coat will be similarly feathered, or be pushed further into the gap 11 where they will, if appropriately configured, expand into sealing relationship with the opposite faces of the gap. This will expose the unprimed edge for the direct application of a hard lacquer coat, with no discernible edge due to the feathering action of the tape 14.

Figure 8:
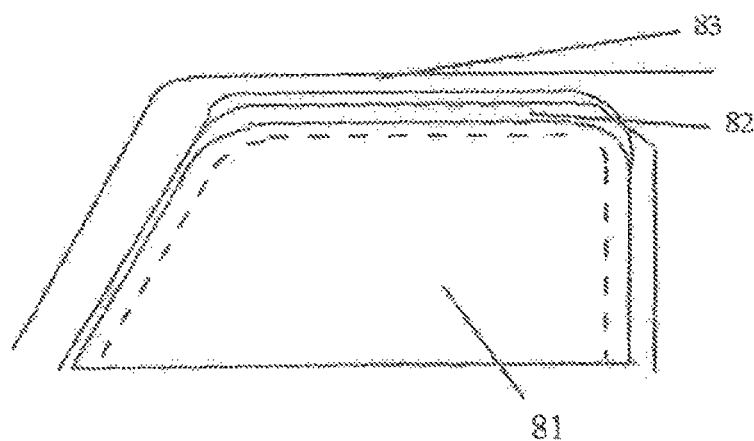
FIG. 8 is a view of an automobile window being masked.

FIG. 8 illustrates how an automobile door window may be masked, which is of the kind having no trim around its edges, being adapted to be wound up from within the door to fit into a window surround. With the window 81 slightly wound down so as to expose the edges of the glass, the masking tape 82, having a cross section like that illustrated in FIG. 1 is introduced into the gap so as to extend all the way round the window 81. The window may then be wound up fully, which will trap the tape 82. and mask the window 81 while the automobile door surround or roof 83 is sprayed. Other areas where the tape may be deployed are headlamps and other lamp clusters and around radiator grilles and air intakes.

In use, masking tapes substantially as herein described have been found to be very effective and easy to apply. Tapes which have a cross section comprising two equal circles as well as tapes which have a cross section comprising unequal circles, have both been found effective and easy to apply. The cross sections effectively comprise a central groove that can guide the tape around the gap to be masked, so that it is necessary only to insert a part of a length of the tape, which advantageously is on end of the tape, into the gap, then the tape can be pushed around the gap until all the gap is masked.

The tape can be supplied on a roll, which may comprise a rolled up length of formed foam with numerous tear-off tapes, or a single tape wound on to a core, distributed across the length of the core much as a package of yarn is built.

While foam tales have been particularly described, similar tapes may also be made of tubular, or solid, but compressible, plastics materials, which may be of superabsorbent polymer.

The invention claimed is:

1. A method for masking a gap between two members, at least one of which is a panel or is an edge of a panel, comprising trapping a masking tape in the gap, whereby to mask against penetration of paint into the gap, and to hold the masking tape in place without the use of adhesive, characterized by the masking tape having a cross section which is pinched with lobes on either side of the pinch, the masking tape being disposed so that the lobes are on opposite sides of the panel or edge of the panel.

2. The method according to claim 1, in which the relative sizes of the gap and the masking tape are such that the masking tape can be introduced into the gap by compressing a section of one lobe so as to pass through the gap so that one lobe is on one side of the panel or edge of the panel and the other lobe is on the other side of the panel or edge of the panel, but the masking tape is slidable along the gap and the entire gap is masked by slidingly introducing the masking tape.

3. The method according to claim 1 in which the gap is openable for masking tape insertion, and closable to trap the masking tape.

4. The method according to claim 1, in which the masking tape protrudes from the gap and overlies the edge of the panel defining a space tapering towards the edge, whereby to feather the paint towards the edge.

5. The method according to claim 1, in which the masking tape is a foam tape.

6. The method according to claim 1, in which the masking tape comprises a superabsorbent polymer.

7. The method according to claim 1, in which the masking tape is introduced by compressing at one end of the masking tape.

8. A method of masking with a tape, the tape being adapted to mask a gap between a closure panel member and a surround, in which a part of the tape is adapted to protrude from the gap and overlie an edge of the closure panel member defining a space tapering towards the edge, whereby to feather paint towards the edge;

wherein the tape is a strip, has no adhesive stripe, is adapted to be held in the gap solely by a pinching effect, and is resiliently deformable and wider than the gap so that the tape compresses on introduction to the gap to be pinched therein for retention, characterized in that the tape has a cross section which is pinched with lobes on either side of the pinch;

in which a smaller diameter lobe is pushed into the gap, leaving a larger diameter lobe outwith the gap, to form the tapering space by virtue of a cusp between the larger diameter lobe and the edge of the closure panel member.

9. The method of masking with a tape according to claim 8, in which the smaller diameter lobe is held in the gap by elastic deformation of a web joining the smaller diameter lobe and the larger diameter lobe and/or of the smaller diameter lobe, the larger diameter lobe or both the smaller diameter lobe and the larger diameter lobe.

\* \* \* \* \*